Feb. 18, 1964 W. J. SCHROEDER 3,121,502
VEHICLE FOR CLEARING AND LOADING MANURE
Filed Nov. 5, 1962 2 Sheets-Sheet 2

INVENTOR
Walter J. Schroeder
BY
Bacon & Thomas
ATTORNEYS 3,121,502
VEHICLE FOR CLEARING AND LOADING
MANURE
Walter J. Schroeder, Rte. 1, Leipsic, Ohio
Filed Nov. 5, 1962, Ser. No. 235,200
6 Claims. (Cl. 214—131)

This invention relates generally to a vehicle for clearing and loading manure, and more specifically to a vehicle adapted to remove the droppings from beneath chicken houses and the like for loading into a truck, a manure spreader, or the like.

Commercial poultry operations commonly employ large numbers of cages, usually arranged in rows with aisles therebetween. Each cage has a capacity of five to ten thousand hens and is suspended from above. The floors of the cages are formed of chicken wire or other wire mesh material and there is a steady accumulation of manure in pits disposed beneath the respective cages. At the present time this accumulation can only be removed by shovels and hand scoops, which is a time-consuming and unpleasant operation.

The primary object of the present invention, therefore, is to provide a vehicle for efficiently clearing manure from beneath commercial poultry houses and the like and to thereby obviate the necessity of a manual clearing operation which would involve crawling under the houses and shoveling out the accumulated droppings.

Another object is to provide a vehicle of the type referred to above wherein the operating portion, including the scoop, is constructed and supported in such a way that it can readily be maneuvered into position and operated under a chicken house which is supported approximately 2½ to 3 feet above the ground, and wherein the operator from an outboard position is in full control of the vehicle and the scoop.

Another object is to provide a vehicle which operates efficiently both in scooping up a load and in unloading the same.

A further object of the invention is to provide a vehicle of this general type which is rigid in construction, economical to manufacture and durable in use.

Other objects and advantages will be apparent from the following specification when read in conjunction with the accompanying drawings, in which:

FIG. 4 is a fragmentary sectional view taken on the line 4—4 of FIG. 1; and

Figure 1:
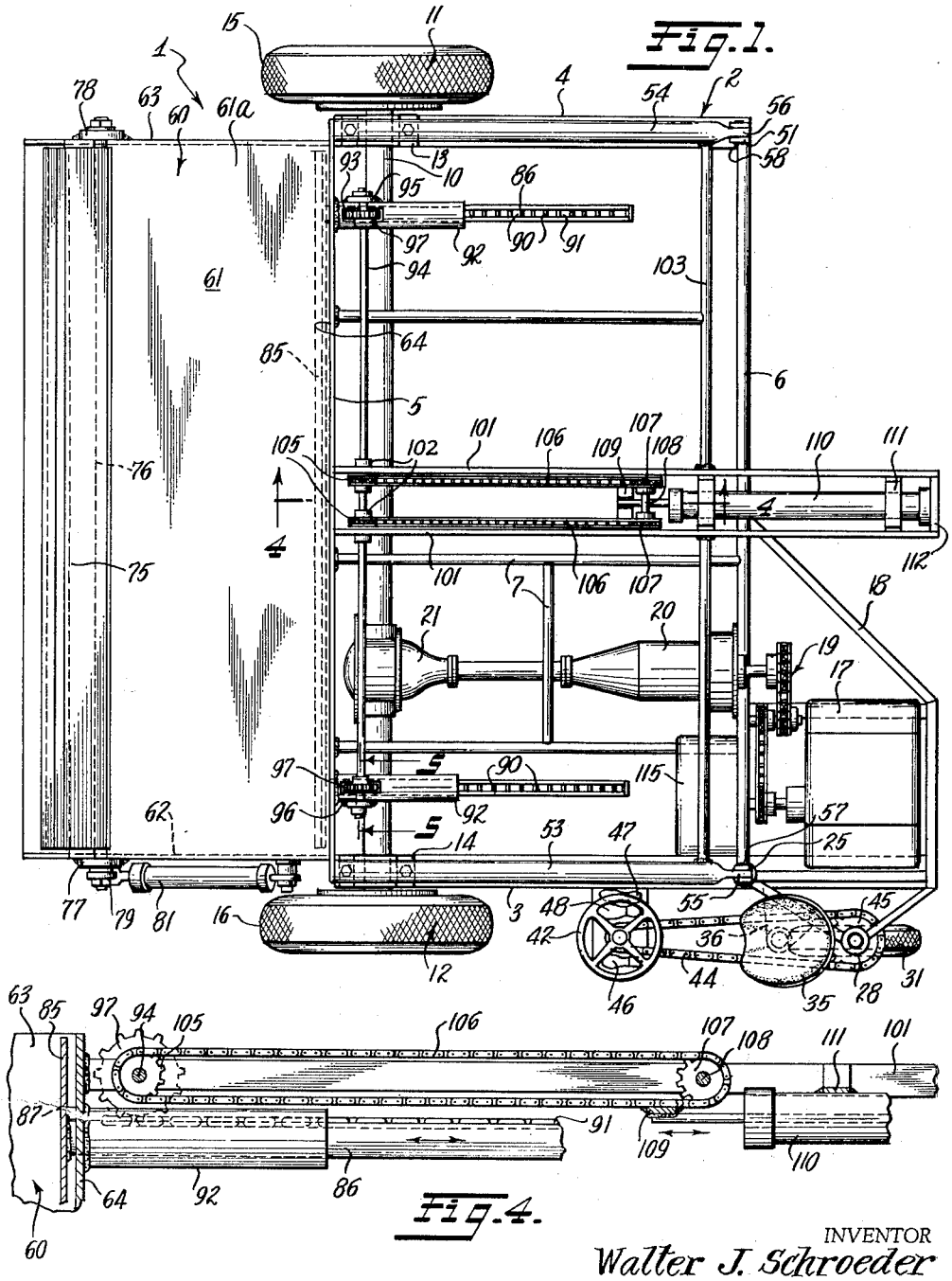
FIG. 1 is a top plan view illustrating a vehicle constructed in accordance with the principles of the present invention.

Referring now more specifically to the drawings, the vehicle, generally indicated by the numeral 1, comprises a frame 2 including a pair of spaced, parallel side frame members 3 and 4. Front and rear frame members 5 and 6, respectively, are disposed transversely between members 3 and 4 in spaced, parallel relation and these in turn may be braced by a plurality of longitudinal bracing members 7 secured therebetween.

An axle 10 carrying ground-engaging wheels 11, 12 at either end thereof is mounted at the forward end of frame 2, as by bearing blocks 13, 14 secured on the side frame members 3 and 4, respectively. The wheels 11, 12 are provided with snow tires 15, 16 or other tires having gripping treads for efficient operation under the conditions required.

A gasoline engine 17 is mounted at the rear of frame 1, preferably in a cage 18 projecting rearwardly of the frame. As best seen in FIG. 1, the engine 17 is connected through drive chain means 19 to a three-speed transmission 20 and the power output is in turn applied to axle 10 through a differential connection 21.

A pedestal 25 is mounted at the rear of side frame member 3 and has a pair of supporting arms 26, 27 extending outwardly and rearwardly therefrom which carry a bearing column 28 at their outer ends. Bearing column 28 is further supported by a second pair of supporting arms 29, 30 connected to the rear of the cage 18. A rear wheel 31 is mounted in fork 32 which extends upwardly and is rotatably received in the bearing column 28. An operator's seat 35 is mounted above wheel 31 on a lug 36 extending outwardly from the lower supporting arm 26.

A platform 40 is secured to the outside of side frame member 3 and serves to mount a steering column 41 having a steering wheel 42 at the upper end thereof. A sprocket 43 mounted along the length of steering column 21 is connected by a chain 44 to a sprocket 45 on the column 32, to steer the rear wheel 31. The platform 40 may also serve to mount such controls as a clutch 46 (FIG. 1), and brake pedals 47, 48 connected to the respective drive wheels. The required connections between these control elements and the appropriate controlled elements on the vehicle are conventional and form no part of the present invention. For purposes of clarity, therefore, they have been excluded in the drawings.

The upper end of pedestal 25 is bifurcated and there is a corresponding bifurcated pedestal 51 mounted on the rear end of side frame member 4. A pair of supporting arms 53, 54 are provided with tongues 55, 56 at the rear extremities thereof and these are pivotally secured in the bifurcated ends of pedestals 25 and 51, respectively, by pins 57, 58. Arms 53, 54 extend forwardly above side frame members 3 and 4 and carry, at their forward ends, a scoop 60. Scoop 60 includes top and bottom walls 61, 61a, side walls 62, 63 and a rear wall 64 which extends outwardly beyond the side walls and is secured to the forward ends of arms 53, 54. The scoop 60 is raised and lowered by a hydraulic jack 65 which is secured beneath supporting arm 53 with its lower end pivoted rearwardly and mounted on side frame member 3. A second hydraulic jack may be mounted in a similar manner between arms 54 and frame member 4, if desired.

Figure 2:
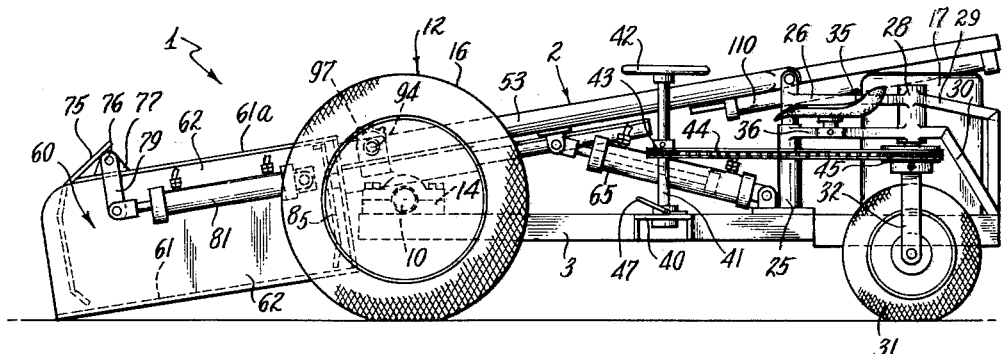
FIG. 2 is a side elevation of the vehicle of FIG. 1, shown here with its scoop in lowered position and the unloading plate therein in retracted position.

A gate 75 is provided with a shaft 76 extending along its upper edge and projecting from either side thereof. The ends of shaft 76 are received in lugs 77, 78 secured respectively to the side walls 62, 63. One end of the shaft 76 extends through the lug 77 and has a bell crank lever 79 mounted on its outer end. The bell crank lever is in turn operated by a hydraulic jack 81 pivotally mounted on the side wall 62. Actuation of the hydraulic jack 81 causes the gate 75 to reciprocate between the closed position shown in FIG. 2, closing off the otherwise open front end of scoop 60, to the open position shown in FIG. 3.

The scoop 60 is also provided with a pusher plate 85 mounted transversely across the entire extent thereof. Plate 85 is movably mounted for reciprocation within the scoop 60 by means of a pair of shafts 86 extending rearwardly therefrom through openings 87 in the rear wall 64. In the present embodiment, shafts 86 are hollow and are each provided with a slot 89 adapted to receive a plurality of rack teeth 90, as by welding a linked chain 91 in each slot. Shafts 86 extend in telescoping relation through tubes 92, each aligned with the respective opening 87. Each tube 92, in turn, has a longitudinal slot 93 aligned with the teeth 90. A shaft 94 is mounted transversely behind rear wall 64, being rotatably received at either end in bearings 95 secured to the respective tubes 92 by brackets 96. Shaft 94 carries a pair of pinions 97 which have their lower ends extending through slots 93 to operatively engage the teeth 90 of the respective chains 91.

A pair of spaced parallel support members 101 extend rearwardly from rear wall 64 in the central portion thereof and may include bearings 102 for supporting the central portion of shaft 94. The rear portion of supporting members 101 may be carried by a transverse brace 103 extending between supporting arms 53, 54. A pair of forward sprocket wheels 105 are mounted on shaft 94 between support members 101 and are respectively connected by chains 106 to a pair of rear sprocket wheels 107, which are mounted for rotation on a shaft 108. The shaft 108 is secured between support members 101, rearwardly of the forward sprockets 105, and the rear sprockets 107 are aligned with the respective forward sprockets. A strut 109 is mounted between the lower trains of chains 106 and is operatively connected to a hydraulic jack 110 for reciprocal movement of the chains in response to actuation of the jack. The hydraulic jack 110 is mounted in brackets 111 between the support members 101 at the rear thereof and bears against a rear plate 112 connecting the rearward extremities of the respective support members.

Figure 3:
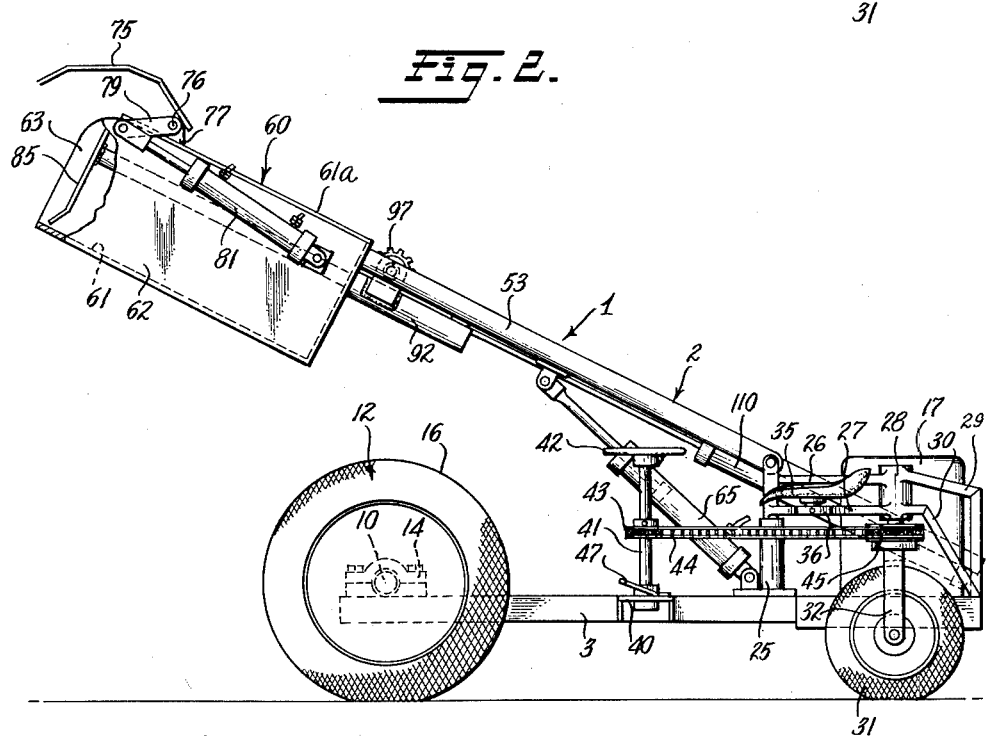
FIG. 3 is a view similar to FIG. 2, the vehicle being shown here with its scoop in raised position and the unloading plate in extended position.
Figure 5:
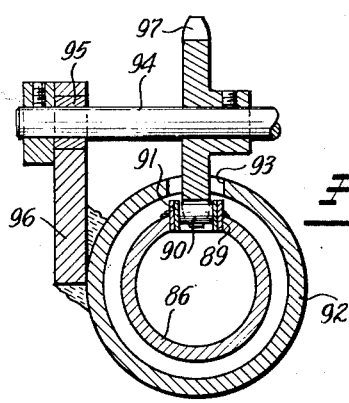
FIG. 5 is a fragmentary sectional view taken on the line 5—5 of FIG. 1.

In operation the side of the vehicle on which the operator's station 27 is disposed is positioned immediately outside the plane of the hen house side wall. The scoop 60 is in lowered position and is disposed underneath the hen house. By actuation of jack 81 the gate 75 is opened to the position in which it is shown in FIG. 3 and the vehicle is driven forward to scoop up the manure which has accumulated under the hen house. When the scoop 60 is filled to its effective capacity the gate 75 is closed and the vehicle is driven away from the hen house. When an unloading station is reached the jack 65 may be actuated to raise scoop 60 to the level indicated in FIG. 3. The gate 75 is again opened and the jack 110 is actuated, thereby rotating chains 106, sprockets 105 and pinions 97 to move shafts 86 forwardly. This actuates the pusher plate 85, which moves forwardly to force the contents of scoop 60 through the front opening. The various components are then returned to their original position, so that the vehicle can pick up another load.

In the drawings the source of hydraulic power has been indicated by the numeral 15, but the hydraulic fluid lines and the controls therefor are conventional and have been eliminated for purposes of clarity. It will be readily understood by those skilled in the art, however, that the controls are positioned immediately adjacent the operator's station and that any conventional control means and flow lines may be employed.

While one embodiment only has been disclosed by way of example in the present application, numerous modifications may be made without departing from the spirit of the invention or the scope of the annexed claims.

I claim:

1. A vehicle for clearing and loading manure from beneath poultry houses elevated approximately three feet above the ground, said vehicle comprising: a chassis frame supported by wheels including a pair of wheels mounted at the opposite sides thereof; a scoop disposed in transverse relation with respect to said frame and mounted at one end thereof, said scoop including one side wall disposed substantially in alignment with one side of said chassis frame and including a bottom terminating in an elongated leading edge for scooping manure; power means for driving at least one of said wheels to move said vehicle longitudinally forward; an operator's seat mounted on said chassis frame and disposed in outboard relation with respect thereto, outwardly of said one side thereof, said operator's seat being thereby disposed in laterally offset relation with respect to the path of movement of said scoop; and steering means disposed in longitudinal alignment with said seat and adjacent thereto, said steering means being connected to at least one of said wheels to steer said vehicle, the portion of said vehicle, including said scoop and said frame, disposed inwardly of said one side of said frame being of sufficiently limited vertical dimensions to permit free movement beneath said poultry houses and said operator's seat being disposed generally at the same level as the upper extremities of said scoop and said frame, whereby said vehicle may be driven into loading position with relation to an elevated poultry house with substantially the entire extent of said frame and said scoop being disposed thereunder and with an operator mounted on said seat in a position outwardly of the adjacent wall of said poultry house to control the operation of said vehicle.

2. The vehicle of claim 1, wherein said scoop is pivotally mounted on said frame for movement in a generally vertical direction and is disposed forwardly thereof, and wherein hydraulic means are provided for raising and lowering said scoop.

3. The vehicle of claim 2, wherein said scoop is provided with a rear wall, a bottom wall and side walls and is normally open at the front, a gate being mounted at the front of said scoop to selectively close the same and retain a load therein.

4. The vehicle of claim 3, wherein an upright unloading plate is disposed within said scoop across the rear portion thereof and means are provided for moving said plate forwardly to displace the load within said scoop.

5. A vehicle according to claim 1 wherein said frame comprises a pair of spaced parallel side frame members and a pair of spaced parallel front and rear frame members secured therebetween, said wheels including a pair of drive wheels mounted at either end of an axle mounted transversely with respect to said frame, and wherein a rear wheel is mounted in outboard relation at the rear end of said frame and connected to said steering means.

6. A vehicle according to claim 1 including a power source mounted on said frame adjacent said one side thereof and power transmission means for connecting said power source with at least one of said pair of wheels to drive the vehicle.

References Cited in the file of this patent
UNITED STATES PATENTS

| | | |
|---|---|---|
| 2,485,110 | Porkorny | Oct. 18, 1949 |
| 2,607,432 | Lommel | Sept. 15, 1949 |
| 2,619,242 | Crampton et al. | Nov. 25, 1952 |
| 2,881,931 | Mackie | Apr. 14, 1959 |
| 2,887,236 | Mindrum | May 19, 1959 |
| 2,979,215 | Brisson | Apr. 11, 1961 |
| 3,003,586 | Loef et al. | Oct. 10, 1961 |
| 3,021,024 | Nagin | Feb. 13, 1962 |